United States Patent
Feldmann et al.

(12)

(10) Patent No.: US 6,357,125 B1
(45) Date of Patent: Mar. 19, 2002

(54) ADJUSTABLE STROKE MECHANISM FOR A SCOTCH YOKE ASSEMBLY

(75) Inventors: Martin Feldmann, Gurnee, IL (US); Vance E. Roe, Jackson, TN (US)

(73) Assignee: S-B Power Tool Company, Chicago, IL (US)

(*) Notice: Subject to any disclaimer, the term of this patent is extended or adjusted under 35 U.S.C. 154(b) by 0 days.

(21) Appl. No.: 09/556,357

(22) Filed: Apr. 24, 2000

(51) Int. Cl.$^7$ .................... B27B 3/26; B23D 49/11
(52) U.S. Cl. .................... 30/392; 30/277.4; 74/50; 83/530
(58) Field of Search .................... 30/392, 393, 394, 30/277.4; 74/50, 104; 83/530

(56) References Cited

U.S. PATENT DOCUMENTS

| | | | |
|---|---|---|---|
| 2,704,941 A | * | 3/1955 | Holford |
| 2,764,188 A | * | 9/1956 | Hoffman |
| 3,188,873 A | | 6/1965 | Vowell et al. |
| 3,398,588 A | | 8/1968 | Meier |
| 4,031,763 A | | 6/1977 | Eisenberg |
| 4,236,874 A | * | 12/1980 | Sisk |
| 4,245,966 A | * | 1/1981 | Riffe |
| 4,261,228 A | * | 4/1981 | Eagan, Sr. |
| 4,272,996 A | | 6/1981 | Sanerwein |
| 4,494,447 A | * | 1/1985 | Sisk |
| 4,580,460 A | * | 4/1986 | Chang et al. |
| 5,134,777 A | | 8/1992 | Meyer et al. |
| 5,212,887 A | | 5/1993 | Farmerie |
| 5,581,896 A | * | 12/1996 | Yang |
| 5,644,846 A | * | 7/1997 | Durr et al. |
| 5,988,994 A | * | 11/1999 | Berchowitz |
| 6,092,993 A | * | 7/2000 | Young et al. |
| 6,138,364 A | * | 10/2000 | Schmitz |
| 6,190,137 B1 | * | 2/2001 | Robbins et al. |

* cited by examiner

*Primary Examiner*—Kenneth E. Peterson
*Assistant Examiner*—Thomas J Druan, Jr.
(74) *Attorney, Agent, or Firm*—Greer, Burns & Crain, Ltd.

(57) ABSTRACT

A scotch yoke mechanism for converting rotational movement into reciprocating linear movement and having an adjustable stroke length. The scotch yoke mechanism includes a stroke length toggle eccentrically connected to a cam such that the stroke length toggle may assume one of first and second positions. The first position defines a first stroke length which is shorter than a second stroke length defined by said second position. Rotational movement of the cam causes the stroke length toggle to assume the first position when the cam is rotated in a first direction to assume the second position when the cam is rotated in a second direction opposite the first direction.

13 Claims, 2 Drawing Sheets

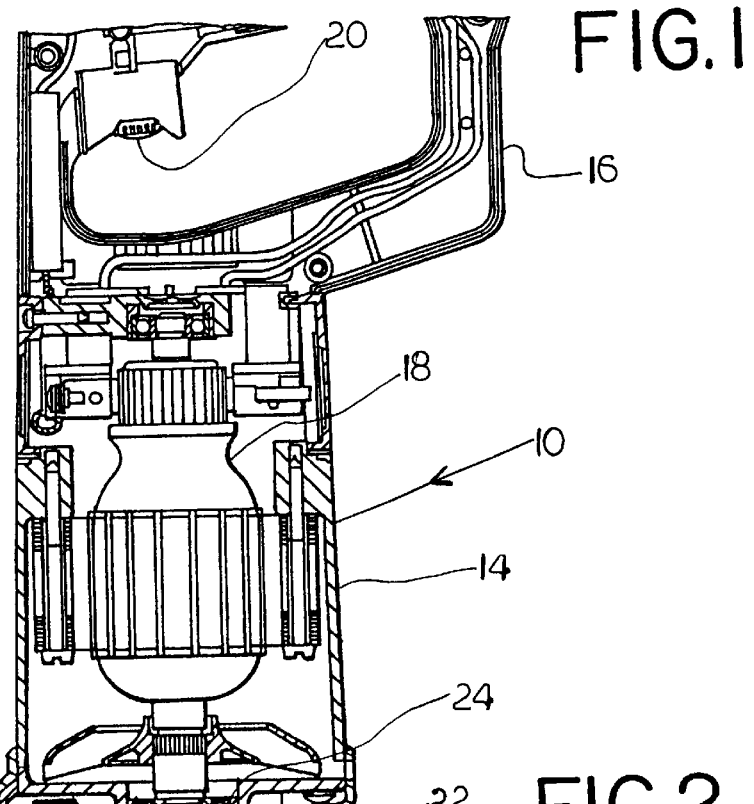
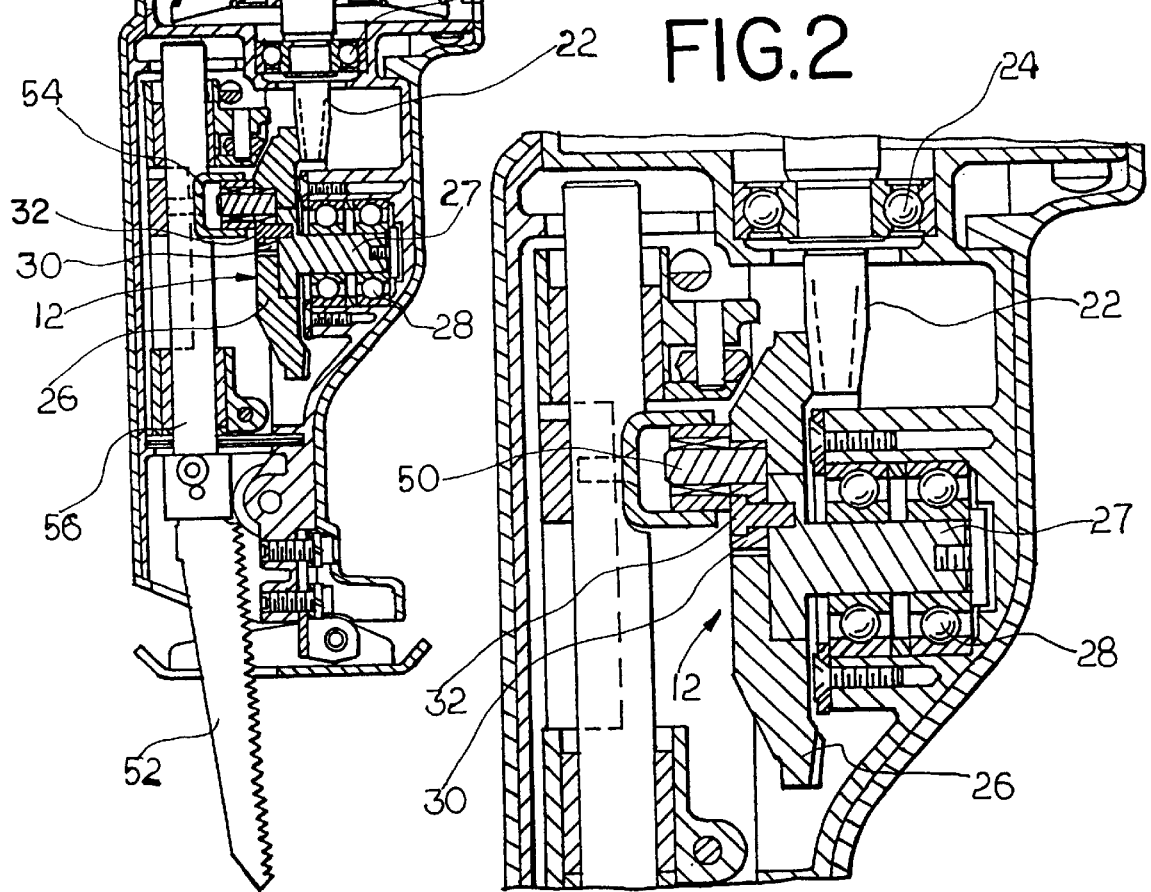

ADJUSTABLE STROKE MECHANISM FOR A SCOTCH YOKE ASSEMBLY

FIELD OF THE INVENTION

The present invention relates to a mechanism for converting rotary motion into linear motion. More particularly, the present invention relates to a scotch yoke assembly that produces two different stroke lengths and is selectively determined by the rotational direction of a cam. The scotch yoke assembly of the present invention is particularly suited for reciprocating a tool, such as a saw blade.

BACKGROUND OF THE INVENTION

The present invention has applicability to power tools, and in particular to power tools having reciprocating drive mechanisms. Jigsaws and other reciprocating saws (referred to in the trade as "recipro" saws) are the most common types of power tools having a reciprocating drive mechanism. However, it will be understood that the present invention has general applicability to any power tool that utilizes a reciprocating drive mechanism.

Reciprocating saws of the general type to which the present invention pertains typically include an electric motor arranged to drive a reciprocating saw blade drive mechanism, which may be of the scotch yoke type. More particularly, the motor shaft is mechanically coupled to a crank plate having an eccentrically located crank pin that is drivingly received within the slot of a reciprocating yoke member. The yoke member is coupled to the saw blade plunger sometimes referred to as a ram.

Mechanisms of the type described, although generally satisfactory, do not provide a means for adjusting the stroke of the reciprocating member. As is known to those skilled in the art, it is desirable to be able to vary the stroke of a reciprocating saw blade depending on the nature of the work being cut.

Reciprocating saws and jigsaws are used to cut a variety of materials, including materials which differ widely in density. As is known to those skilled in the art, as a general rule it is desirable when cutting soft materials to provide the saw blade with a rather large stroke, say two inches for purposes of illustration. On the other hand, when cutting hard materials it is desirable to provide the blade with a much shorter stroke, say a stroke of one inch for purposes of illustration. Thus, it is very desirable to provide an adjustable stroke reciprocating mechanism thereby to permit the tool to cut efficiently irrespective of the nature of the material being cut.

Aside from varying the stroke of the saw blade to accommodate materials of varying properties, it is also advantageous to be able to shorten the stroke of the saw blade to be able to cut objects in cramped or confined environments. Minimizing the stroke of the blade in such an instance reduces the possibility of unintended contact between the tip of the blade and other objects in the vicinity of the member being cut.

An adjustable stroke mechanism is disclosed in U.S. Pat. No. 5,134,777. This stroke mechanism utilizes a planetary gear system including a ring gear and an idler gear. The stroke length of a crank pin is adjusted by varying the position of the ring gear relative to the idler gear.

The '777 patent discloses a relatively flexible arrangement involving a relatively large number of parts including a generally circular actuator plate mounted within a tool housing for rotation about an axis of a drive shaft. The actuator has a number of projections which are received within corresponding recesses in the ring gear thereby connecting the actuator plate to the ring gear. Moreover, the actuator plate includes a generally elliptical opening to accommodate movement of the crank pin. Adjustment of the stroke length of the crank pin is achieved by rotating the actuator plate which causes the crank pin to move along an elliptical path. The stroke mechanism of the '777 patent is advantageous in that any of a number of discrete stroke lengths can be selected; however, this flexibility comes at the expense of a complex design involving a relatively large number of parts. Consequently, a stroke mechanism according to the '777 patent is relatively expensive to manufacture.

Accordingly, it is an object of the present invention to provide an improved adjustable stroke mechanism for a scotch yoke assembly which utilizes fewer parts than known scotch yoke assemblies having such stroke length adjust ability.

Another object of the present invention is to provide an improved adjustable stroke mechanism in which one of two stroke lengths is selected in accordance with a rotational direction of a cam.

Yet another object of the present invention is to provide a reciprocating saw with an improved adjustable stroke mechanism for linearly driving a saw blade at one of two lengths in accordance with a rotational direction of a reversible rotary motor.

SUMMARY OF THE INVENTION

The above-described objects are met or exceeded by the present adjustable stroke mechanism for a scotch yoke assembly. The scotch yoke assembly of the present invention is comprised of a rotatable cam having a stroke length toggle eccentrically mounted to a surface thereof. Rotational movement of the cam causes the stroke length toggle to assume either a first or a second position depending on the direction of rotation. The first position defines a first stroke length which is shorter than a second stroke length defined by the second position.

The improved scotch yoke mechanism of the present invention uses fewer parts than conventional mechanisms, and is easier to adjust. Notably, the stroke length may be adjusted simply by reversing the rotational direction of the cam.

DESCRIPTION OF THE DRAWINGS

FIG. 1 is a side view of a power operated reciprocating saw, shown partially in section, embodying the adjustable stroke mechanism of the present invention;

FIG. 2 is an enlarged view of a portion of FIG. 1;

DESCRIPTION OF THE INVENTION

Figure 3:
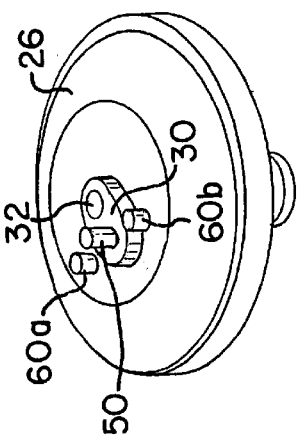
FIG. 3 is a perspective view of the adjustable stroke mechanism for a scotch yoke assembly according to the present invention.

The adjustable stroke mechanism of the present invention is particularly suited for incorporation into a reciprocating power tool such as a reciprocating saw or a jig saw. However, one of ordinary skill in the art will appreciate other applications for the adjustable stroke mechanism of the present invention. By manner of illustration, FIG. 1 is a partial sectional view of a reciprocating saw 10 including a scotch yoke assembly, indicated generally at 12, of the present invention, and FIG. 2 is an enlarged view of a portion of FIG. 1. Throughout the drawings, like numerals are intended to describe like parts.

The reciprocating saw 10 includes a housing 14 having a handle 16. The reciprocating saw 10 may be electrically or pneumatically operated. In FIG. 1, the reciprocating saw 10 is electrically powered, and includes an electric motor 18 contained within the housing 14 and configured to be energized by the trigger switch 20.

Rotational movement of the electric motor 18 is transmitted to the scotch yoke assembly 12 via an output shaft 22. More specifically, the output shaft 22 is rotatably supported by a pair of ball bearings 24, and is connected at one end to the electric motor 18. The output shaft 22 has teeth (not specifically illustrated) which engage gear teeth of the scotch yoke assembly 12.

A rotational direction of the motor 18 can be reversed by way of a reverse switch (not illustrated). The rotational movement of the motor 18 is converted into a linear reciprocating motion by the scotch yoke assembly 12.

Figure 5:
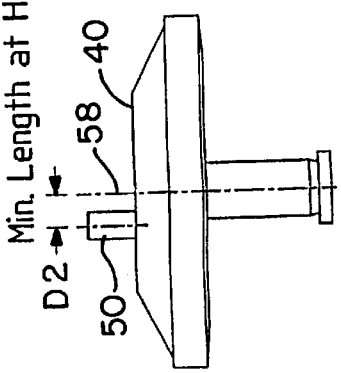
FIG. 5 is a sectional view taken along the line 5—5 of FIG. 4A and in the direction generally indicated.

As best shown in FIGS. 2 and 5, the scotch yoke assembly 12 features a cam 26 mounted on a stub shaft 27 which is adapted to be rotationally driven by the motor 18. The stub shaft 27 is rotatably supported upon a pair of ball bearings 28.

Figure 6:
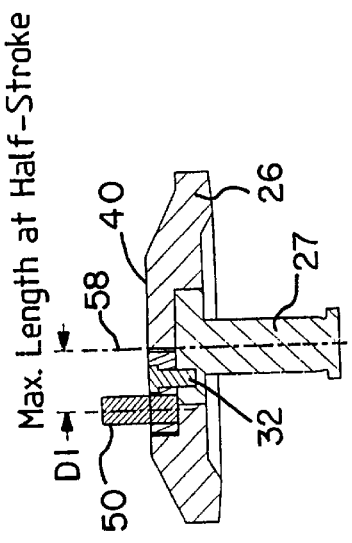
FIG. 6 is a side view taken from the right side of the adjustable stroke mechanism of FIG. 4B.
Figure 4A:
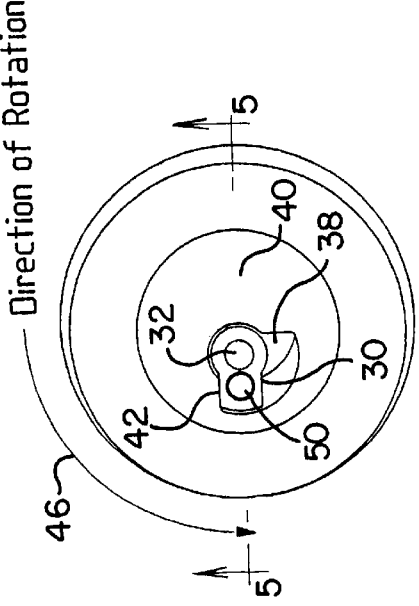
FIGS. 4A and 4B are top views of the adjustable stroke mechanism of FIG.
Figure 4B:
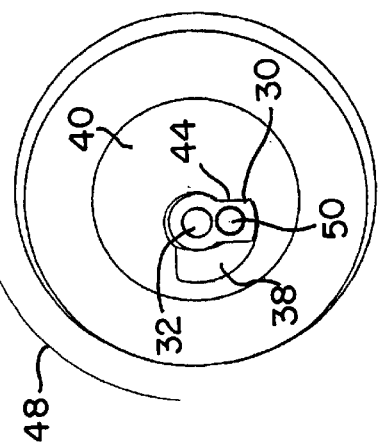

As shown in FIGS. 3–6, the scotch yoke assembly 12 includes a stroke length toggle 30 which is eccentrically connected to the cam 26 by a pin 32 such that the toggle 30 may be freely moved between a first position shown in FIGS. 4A and 5 and a second position shown in FIGS. 4B and 6. More particularly, the stroke length toggle 30 is pivotable between first and second positions. According to a preferred embodiment, the stroke length toggle 30 is pivotally mounted within a recess or cavity 38 defined in an upper surface 40 of the cam 26.

The cavity 38 is adapted for receiving the stroke length toggle 30. The cavity 38 is generally shaped like a quarter circle, and has walls 42, 44 which define the maximum displacement of the stroke length toggle 30. Notably, the stroke length toggle is configured to freely rotate into abutment with the cavity wall 42 when the cam 26 is rotated in a first direction 46 (FIG. 4A), and freely rotate into abutment with the cavity wall 44 when the cam 26 is rotated in a second direction 48 (FIG. 4B). In other words, cavity wall 42 and cavity wall 44 define the maximum displacement of the stroke length toggle 30.

The stroke length toggle 30 is provided with a drive pin 50 which is generally orthogonal to the surface 40 of the stroke length toggle. The drive pin 50 is configured to drive a working tool such as a saw blade 52 (best seen in FIG. 1). More particularly, the drive pin 50 is operably connected to a drive bracket 54 which in turn is operably connected to a ram 56 which drives the saw blade 52.

As shown in FIGS. 5 and 6, the drive pin 50 is eccentrically positioned relative to a rotational center 58 of the cam 26. Consequently, the drive pin 50 follows an elliptical path as the cam 26 is rotated. Moreover, the eccentricity of the drive pin 50 varies depending on the position of the stroke length toggle 30.

As shown in FIG. 5, the drive pin 50 is a distance D1 from a rotational center 58 of the cam 26 when the stroke length toggle 30 is in abutment with the wall 42. Correspondingly, as seen in FIG. 6, the drive pin 50 is a distance D2 from a rotational center 58 of the cam 26 when the stroke length toggle 30 is in abutment with the wall 44, where D1 is greater than D2. Thus, when the cam 26 is rotated in the first direction 46, the drive pin 50 follows a first elliptical path which is longer than a second elliptical path when the cam 26 is rotated in the reverse direction. In other words, the stroke length of the drive pin 50 is adjusted in relation to the rotational direction of the cam 26.

One of ordinary skill in the art will appreciate that the adjustable stroke mechanism for a scotch yoke assembly of the present invention is appreciably easier to construct and use than known conventional mechanisms. As described above, the stroke length may be adjusted simply by reversing the rotational direction of the cam.

Figure 7:
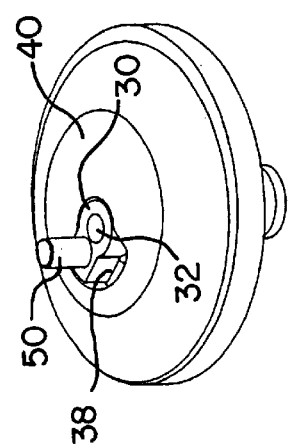
FIG. 7 is a perspective view of an alternative embodiment of the adjustable stroke mechanism for a scotch yoke assembly according to the present invention.

Furthermore, one of ordinary skill in the art will appreciate that there are numerous other ways to define the maximum displacement of the stroke length toggle 30. FIG. 7 illustrates an alternate embodiment in which the first and second positions of the stroke length toggle are defined by a pair of end position stops such as a pins 60a and 60b. The pin 60a is mounted to the cam 26 such that the stroke length toggle 30 freely rotates into abutment with the pin 60a when the cam 26 is rotated in a first direction 46. Likewise, pin 60b is mounted on the cam 26 such that the stroke length toggle 30 freely rotates into abutment with the pin 60b when the cam 26 is rotated in a second direction 48.

End position stops such as pins 60a and 60b serve the same purpose as walls 42, 44, and thus this embodiment of the invention renders it unnecessary to mount the stroke length toggle 30 within a cavity 38. Other ways of defining the maximum displacement of the stroke length toggle 30 are readily apparent to one of ordinary skill in the art, and fall within the scope of the present invention.

While a preferred embodiment of the scotch yoke mechanism of the present invention has been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A scotch yoke mechanism for a reciprocating saw including a reversible rotary motor which is rotatable in both first and second directions, the second direction being opposite to the first direction, the reciprocating saw further including a saw blade operably connected to the motor such that rotational movement of the motor is converted into linear movement of the saw blade, said scotch yoke mechanism comprising:

a cam operably connected to and receiving rotational force from the motor, and a stroke length toggle eccentrically connected to said cam, said stroke length toggle being adjustable between a first position and a second position, said stroke length toggle being operably connected to the saw blade;

wherein rotation of said cam in said first direction causes said stroke length toggle to assume said first position which defines a first stroke length;

wherein rotation of said cam in said second direction causes said stroke length toggle to assume said second position which defines a second stroke length;

said first stroke length being different than said second stroke length.

2. A scotch yoke mechanism according to claim 1, further comprising a drive pin operably connected to said stroke length toggle and extending in a direction generally orthogonal to said surface of said stroke length toggle, said drive pin being operably connected to the saw blade such that rotational movement of the gear is converted into linear driving motion which is transmitted to the saw blade.

3. A scotch yoke mechanism according to claim 1, wherein said stroke length toggle is rotatably attached to said cam by a pin.

4. A scotch yoke mechanism according to claim 1, wherein said cam defines a recessed cavity configured to at least partially receive said stroke length toggle; and, said stroke length toggle is at least partially received within said recessed cavity.

5. A scotch yoke mechanism according to claim 4, wherein said recessed cavity has a first end and a second end, said first end of said recessed cavity defining a maximum displacement of said stroke length toggle in said first direction and said second end of said recessed cavity defining a maximum displacement of said stroke length toggle in said second direction such that configuration of said recessed cavity determines said first and second stroke lengths.

6. A scotch yoke mechanism according to claim 5, wherein said recessed cavity is generally shaped like a quarter circle.

7. A reciprocating saw for linearly driving a saw blade at one of first and second stroke lengths in accordance with a rotational direction of a reversible rotary motor, said reciprocating saw comprising:

a housing adapted to receive the reversible rotary motor;

an output shaft operably connected to and rotationally driven in one of a first and a second directions by the reversible rotary motor;

a rotatable cam operably connected to and receiving rotational force from said output shaft; and, a stroke length toggle eccentrically connected to said cam, said stroke length toggle being adjustable between a first position and a second position, said stroke length toggle being operably connected to the saw blade;

wherein rotation of said cam in said first direction causes said stroke length toggle to assume said first position which defines a first stroke length;

wherein rotation of said cam in said second direction causes said stroke length toggle to assume said second position which defines a second stroke length;

said first stroke length being different than said second stroke length.

8. A reciprocating saw according to claim 7, further comprising a drive pin operably connected to said stroke length toggle, said drive pin being operably connected to the saw blade such that rotational movement of the gear is converted into linear driving motion which is transmitted to the saw blade.

9. A reciprocating saw according to claim 7, wherein said stroke length toggle is rotatably attached to said cam by a pin.

10. A reciprocating saw to claim 7, wherein said cam defines a recessed cavity configured to at least partially receive said stroke length toggle; and said stroke length toggle is at least partially received within said recessed cavity.

11. A reciprocating saw according to claim 10, wherein said recessed cavity has a first end and a second end, said first end of said recessed cavity defining a maximum displacement of said stroke length toggle in said first direction and said second end of said recessed cavity defining a maximum displacement of said stroke length toggle in said second direction such that configuration of said recessed cavity determines said first and second stroke length.

12. A reciprocating saw according to claim 11, wherein said recessed cavity is generally shaped like a quarter circle.

13. A reciprocating saw comprising:

a housing adapted to receive the reversible rotary motor;

an output shaft operably connected to and rotationally driven in one of a first and a second directions by the reversible rotary motor;

a rotatable cam operably connected to and receiving rotational force from said output shaft; and a stroke length toggle eccentrically connected to said cam, said stroke length toggle being adjustable between a first position and a second position, said stroke length toggle being operably connected to the saw blade;

first and second stop pins mounted to said upper surface of said cam;

wherein rotation of said cam in said first direction causes said stroke length toggle to assume said first position which defines a first stroke length;

wherein rotation of said cam in said second direction causes said stroke length toggle to assume said second position which defines a second stroke length;

said first stroke length being different than said second stroke length;

wherein said first pin defines a maximum displacement of said stroke length toggle in said first direction and said second pin defines a maximum displacement of said stroke length toggle in said second direction, wherein positioning of said first and second pins determines said first and second stroke lengths.

* * * * *